United States Patent
Xu

(10) Patent No.: US 10,303,247 B2
(45) Date of Patent: May 28, 2019

(54) USER GAZE DETECTION

(71) Applicant: Hewlett-Packard Development Company, L.P., Houston, TX (US)

(72) Inventor: Rui Xu, HangZhou (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/518,203

(22) PCT Filed: Jan. 16, 2015

(86) PCT No.: PCT/CN2015/070859
§ 371 (c)(1),
(2) Date: Apr. 10, 2017

(87) PCT Pub. No.: WO2016/112531
PCT Pub. Date: Jul. 21, 2016

(65) Prior Publication Data
US 2017/0308162 A1 Oct. 26, 2017

(51) Int. Cl.
*G06F 3/01* (2006.01)
*H04N 7/14* (2006.01)
(Continued)

(52) U.S. Cl.
CPC .............. *G06F 3/013* (2013.01); *G06F 16/40* (2019.01); *G06F 16/436* (2019.01); *G06F 16/95* (2019.01);
(Continued)

(58) Field of Classification Search
CPC .............. G06F 3/013; G06F 17/30017; G06F 17/30032; G06F 17/30861;
(Continued)

(56) References Cited

U.S. PATENT DOCUMENTS 6,381,339 B1 * 4/2002 Brown .................... G06F 3/013
382/100
7,120,880 B1 * 10/2006 Dryer .................... G06Q 30/02
715/863
(Continued)

FOREIGN PATENT DOCUMENTS

CN 203481086 3/2014
EP 1876616 1/2008
(Continued)

OTHER PUBLICATIONS

Cowen et al. "An eye movement analysis of webpage usability", People and Computers XVI-Memorable yet Invisible: Proceedings of HCI 2002 (pp. 317-335). London: SpringerVerlag Ltd. (Year: 2002).*
(Continued)

*Primary Examiner* — Sardis F Azongha
(74) *Attorney, Agent, or Firm* — HP Inc. Patent Department

(57) ABSTRACT

Examples disclosed herein relate to user gaze detection. In one aspect, a method is disclosed. The method may include detecting a user gaze directed at a region within a content displayed on a display, increasing a level of interest associated with the region, and based at least on the level of interest, determining whether to render the region. The method may also include, responsive to a rendering command, providing the region for rendering based on a determination to render the region, and not providing the region for rendering based on a determination not to render the region.

13 Claims, 6 Drawing Sheets

(51) Int. Cl.
*G06K 9/00* (2006.01)
*G06F 16/435* (2019.01)
*G06F 16/95* (2019.01)
*G06F 16/40* (2019.01)

(52) U.S. Cl.
CPC ......... *G06K 9/00604* (2013.01); *H04N 7/147* (2013.01)

(58) Field of Classification Search
CPC ........... G06K 9/00604; G06K 9/00617; H04N 7/147; G06T 7/0008; G06T 7/0012
See application file for complete search history.

(56) References Cited

U.S. PATENT DOCUMENTS

| | | | |
|---|---|---|---|
| 7,460,940 B2* | 12/2008 | Larsson | A61B 3/113 180/272 |
| 7,930,199 B1* | 4/2011 | Hill | G06F 17/30259 382/118 |
| 8,134,578 B2 | 3/2012 | Fillion et al. | |
| 8,311,279 B2* | 11/2012 | Quarfordt | G06K 9/0061 382/100 |
| 8,487,775 B2* | 7/2013 | Victor | A61B 3/113 180/272 |
| 8,493,390 B2* | 7/2013 | Kalinli | G06F 3/1415 345/428 |
| 8,564,533 B2 | 10/2013 | Yuan | |
| 8,636,361 B2* | 1/2014 | Chen | G06K 9/00604 351/203 |
| 9,507,418 B2* | 11/2016 | Yu | G06F 3/013 |
| 9,619,020 B2* | 4/2017 | George-Svahn | G06F 3/013 |
| 2007/0112916 A1* | 5/2007 | Singh | G06Q 10/107 709/206 |
| 2010/0088586 A1 | 4/2010 | Roudot | |
| 2010/0295774 A1* | 11/2010 | Hennessey | G06F 3/013 345/156 |
| 2013/0021578 A1* | 1/2013 | Chen | G06K 9/00604 351/209 |
| 2014/0002352 A1* | 1/2014 | Jacob | G06F 3/013 345/156 |
| 2014/0195918 A1* | 7/2014 | Friedlander | G06F 3/04842 715/727 |
| 2015/0113454 A1* | 4/2015 | McLaughlin | G06F 3/013 715/765 |
| 2015/0130703 A1* | 5/2015 | Ghajar | G06F 3/013 345/156 |
| 2015/0331240 A1* | 11/2015 | Poulos | G02B 27/017 345/8 |
| 2015/0363071 A1* | 12/2015 | Devale | G06F 3/013 715/782 |
| 2016/0042240 A1* | 2/2016 | Takeda | G06K 9/00597 382/104 |
| 2016/0150956 A1* | 6/2016 | Hakoshima | G06K 9/00604 351/210 |
| 2016/0342205 A1* | 11/2016 | Shigeta | A61B 3/113 |
| 2017/0242481 A1* | 8/2017 | Lu | G06F 3/013 |

FOREIGN PATENT DOCUMENTS

| | | |
|---|---|---|
| JP | H08111141 | 4/1996 |
| JP | H01298615 | 1/1999 |

OTHER PUBLICATIONS

Russell, M., "Using Eye-Tracking Data to Understand First Impressions of a Website," (Web Page), Feb. 13, 2005, 13 pages, available at http://usabilitynews.org/.

Ruz, C., "3D Printing Powered by Thought," (Web Page), Jun. 14, 2013, 8 pages, available at http://www.bbc.com/.

* cited by examiner

400

"Neque porro quisquam est qui dolorem ipsum quia dolor sit amet, consectetur, adipisci velit..."

Lorem ipsum dolor sit amet, consectetur adipiscing elit. Integer elementum magna eget aliquam fermentum. Phasellus scelerisque ornare elit, eu venenatis justo. Maecenas id dolor consectetur, porta quam eget, viverra enim. Ut iaculis malesuada cursus. Vestibulum condimentum ex libero. Pellentesque sed iaculis sem. Maecenas semper elit dolor, non lobortis tortor vulputate a. Quisque tristique ante id felis sagittis ultricies. Etiam pellentesque cursus lacinia. Morbi risus est, bibendum at suscipit varius, accumsan ut nisl. Proin et augue at massa rutrum sollicitudin id ac metus. Praesent commodo accumsan lectus nec lobortis. Duis suscipit molestie sapien eget vestibulum. In condimentum lacus diam, at auctor purus scelerisque vehicula.

Vestibulum vel dolor efficitur, efficitur metus in, interdum sem. Curabitur rhoncus, risus nec consectetur porta, odio elit consectetur orci, ut porttitor nunc justo ac justo Suspendisse congue, eros eget ultrices scelerisque, nunc urna lacinia libero, vel malesuada mi felis ac ante.

Vestibulum molestie ex et felis tincidunt tempor ut aliquam nunc. Aenean feugiat nunc porta velit tincidunt, vitae auctor sem ullamcorper. Nullam venenatis, lacus a maximus faucibus, justo neque mattis nunc, non lacinia orci risus vitae massa.

*FIG. 4*

USER GAZE DETECTION

BACKGROUND

In today's information age, users are often presented with vast amounts of information on the same screen or within the same document. Some of the information may be more relevant than other information, and different users may consider different parts of information as relevant. Moreover, the same user may be interested in different parts of information at different times.

BRIEF DESCRIPTION OF THE DRAWINGS

The following detailed description references the drawings, wherein:

FIG. 4 illustrates example modified content;

DETAILED DESCRIPTION

As discussed above, some of the information or content displayed to a user of a computing device may be interesting to the user, while some may not be. After an initial review of the content (e.g., a detailed reading or a quick scanning) the user may wish to save the content for later, to share it with others, or both. The user may store the content, print them out, send them over the network, and so forth. Examples disclosed herein disclose, among other things, a computing device, a method, and a medium storing executable instructions to determine, based on the initial review of the content by the user, which content is interesting to the particular user and which is not. Furthermore, in some examples, after making this determination, the content may be modified to include only the relevant content.

Some examples disclosed herein describe a computing device. The computing device may include, among other things, a detection engine to obtain a set of images captured by a camera facing a user, and to detect, based on the set of images, a set of gaze locations on a display displaying content. The computing device may also include a layout engine to determine a set of regions within the content, determine, based on the set of gaze locations, a set of regions of interest within the set of regions, and generate modified content comprising the set of regions of interest and not comprising any regions within the set of regions that are not within the set of regions of interest.

Figure 1:
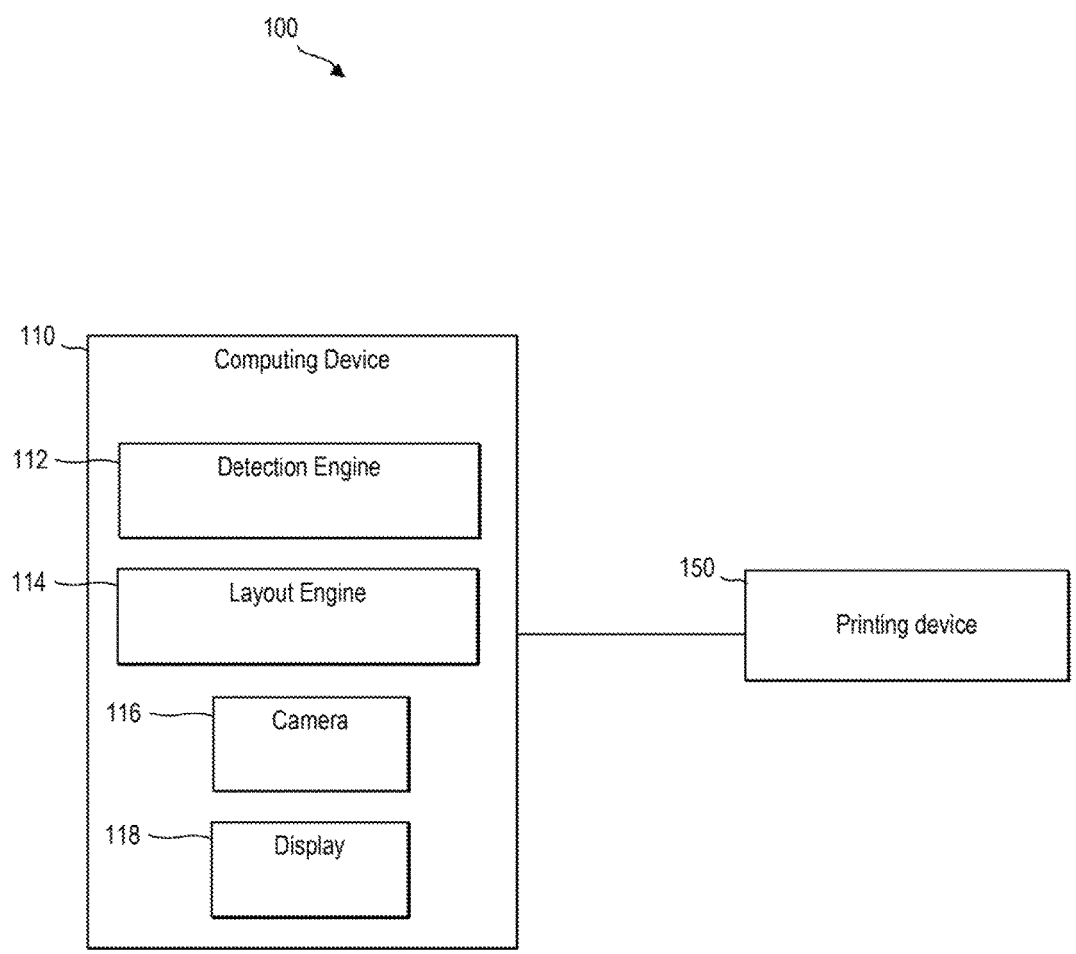
FIG. 1 is a block diagram of an example computing system.

FIG. 1 is a block diagram of an example computing system 100. Computing system 100 may include a computing device 110 that may be communicatively coupled (e.g., wirelessly or via a cable) to a printing device 150.

Printing device 150 may include one or more electronic devices capable of obtaining content (e.g., from computing system 100) and printing out the obtained content. For example, printing device 150 may be a personal printer, a networked or shared printer, a commercial or industrial printer, a 3D printer, an all-in-one device, or any other electronic device capable of printing content.

Computing device 110 may include any electronic device or a combination of electronic devices. For example, computing device 110 may be a desktop computer, a laptop computer, a tablet, a smartphone, a cell phone, a digital TV, or any other electronic device or combination thereof. As illustrated in the example of FIG. 1, computing device 110 may include, among other things, a detection engine 112, a communication engine 114. In some examples, computing device 110 may also include a camera 116 and a display 118. In other examples, camera 116 and/or display 118 may not be included in computing device 110 and may be communicatively coupled to computing device 110. In some examples, camera 116 may not neither be included in computing device 100 nor communicatively coupled to computing device 100.

Display 118 may be any type of display, screen, or monitor that may be communicatively coupled to computing device 110 or be a part of (e.g., embedded in) computing device 110. For example, display 118 may include a liquid crystal display (LCD), light emitting diode (LED) display, organic light-emitting diode (OLED), and the like. Display 118 may be configured to obtain content (e.g., from an operating system or a software application running on computing device 110) and to display the content.

The content may include any combination of text, images, graphics, or any other types of information. The content may include, for example, all or some of the content of one or more documents, such as text documents, webpages, image galleries, etc. The content may also include all or some of the content of one or more files, such as a text file, an image file, a spread sheet file, etc. The content may also correspond to all or some of the content of one or more applications, such as a web browser, a word processor, a text file viewer, or an image viewer, or to the content of one or more individual windows or frames within the application. In some examples, a portion of the content may not being displayed on display 118. For example, the content may include content of a long document or a webpage, only a portion of which may be displayed on display 118 at a given time, while the other portions may be scrolled to.

Figure 2:
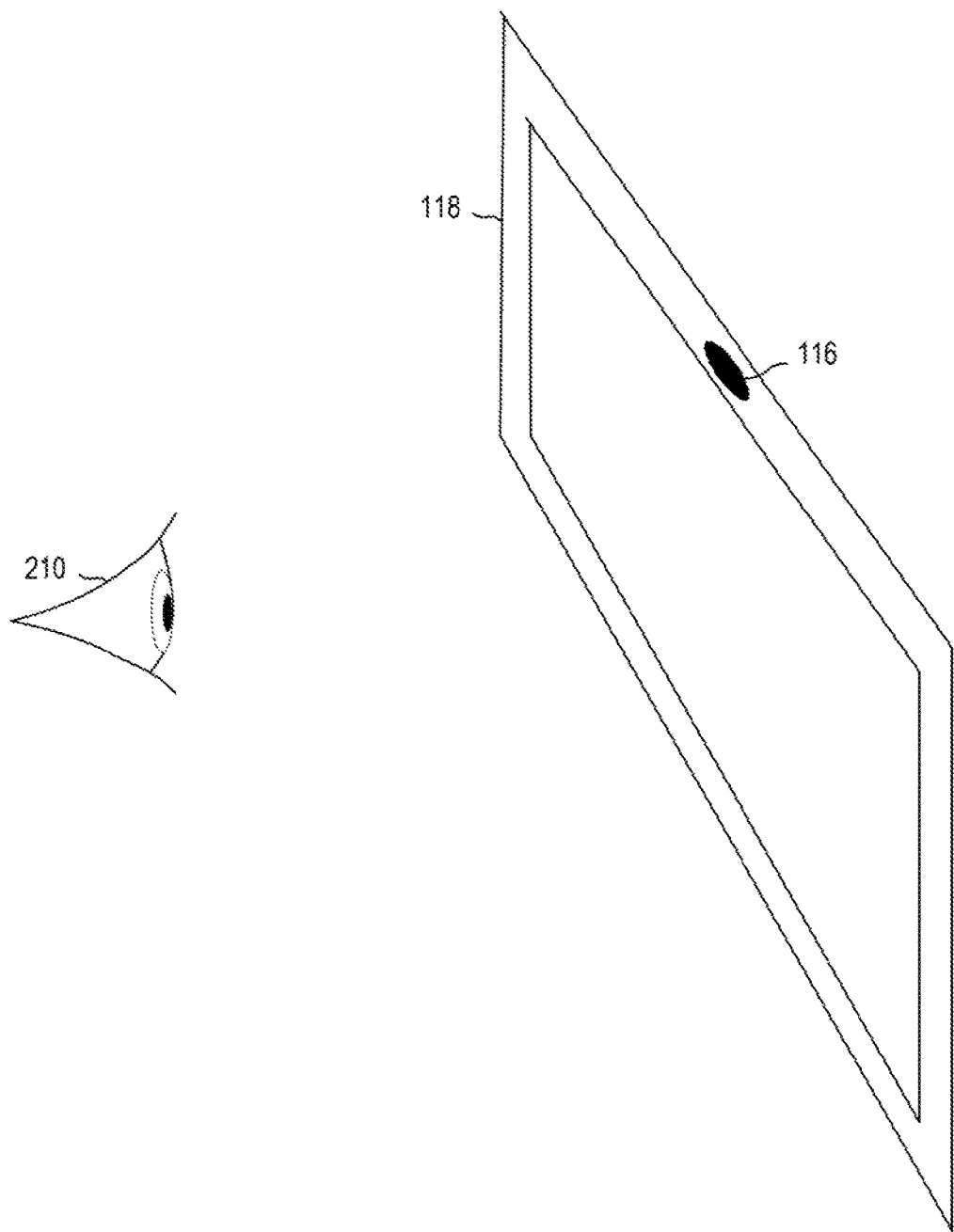
FIG. 2 is a diagram illustrating an example positioning of an example display, an example camera, and a user's eye.

Camera 116 may, in some examples, include any camera or image sensor (e.g., a CMOS sensor, a CCD sensor, etc.) capable of capturing still images and/or video clips. In some examples, camera 116 may be integrated with computing device 110. Specifically, in some examples, camera 116 may be embedded in display 118. In other examples, camera 116 may be separate from and communicatively coupled to computing device 110 (e.g., wirelessly or via a cable). In some examples, camera 116 may be positioned such that its field of view would include objects (e.g. people) located in front of display 118. For example, as illustrated in the example of FIG. 2, camera 116 may be a front-facing camera integrated within display 118 and configured to capture images of a user facing display 118, or of at least one of the user's eyes 210. In some examples, camera 116 may be configured to capture a set of one or more high-resolution images (e.g., 5 megapixels or higher) such that the relative locations of the user's face, eyes, irises, pupils, etc., could be identified based on the set of images. Camera 116 may also be configured to capture consecutive images at a high frame rate (e.g., 10, 30, 60, 120 frames per second or higher) to enable tracking of rapid eye movements by the user. Camera 116 may be sensitive to and capture images in the visible spectrum, infrared spectrum, near-infrared spectrum, or other electromagnetic spectrums.

Detection engine 112 may generally represent any combination of hardware and programming. In some examples, detection engine 112 may be configured to detect user gazes and their respective gaze locations. A gaze location, also referred to as a point of regard, may correspond to a location on the display (e.g., display 118) at which the user is looking at a given moment in time. Detection engine 112 may determine gaze locations using any technologies and techniques suitable for eye tracking or gaze tracking. For example, detection engine 112 employ eye-attached tracking and use a special contact lens communicatively coupled to computing device 110, where the lens may have an embedded mirror or magnetic field sensor. As another example, detection engine 112 may use known electric potential measurement techniques that measure potentials with electrodes placed around the eyes.

As yet another example, detection engine 112 may use non-contact, optical tracking to determine the gaze locations. For example, detection engine 112 may determine the gaze locations by processing a set of one or more images captured by at least one camera (e.g., camera 116). For example, detection engine 112 may detect within the image(s) the absolute and/or relative positions of the head, eyes, irises, pupils, and other facial features, and determine the gaze location using various eye-tracking methods. Such methods may include, for example, limbus tracking, pupil tracking, tracking based on corneal reflections, and any other known methods. Some methods, such as corneal-reflection-based tracking, may use a special light source, such as an infrared source, a near-infrared source, and the like. Such light source may, in some examples be coupled to computing device 110 or be independently placed at or near computing device 110.

In some examples, detection engine 112 may also use pre-stored calibration data for determining the gaze locations. Calibration data may be obtained during a calibration process, which may be performed, for example, at the beginning of each eye-tracking process. During the calibration process, the user may be asked to direct his or her gaze at certain predefined gaze locations. Detection engine 112 may then store, for each predefined location, the corresponding position of the head, various facial features, corneal reflections, and any other information that may later be extrapolated and used by detection engine 112 to determine the gaze locations. In some examples, detection engine 112 may determine gaze the locations at a predefined frequency (e.g., 10, 30, 60, 120 locations per second or higher) and store and/or pass some or all of the determined gaze locations to layout engine 114.

Figure 3:
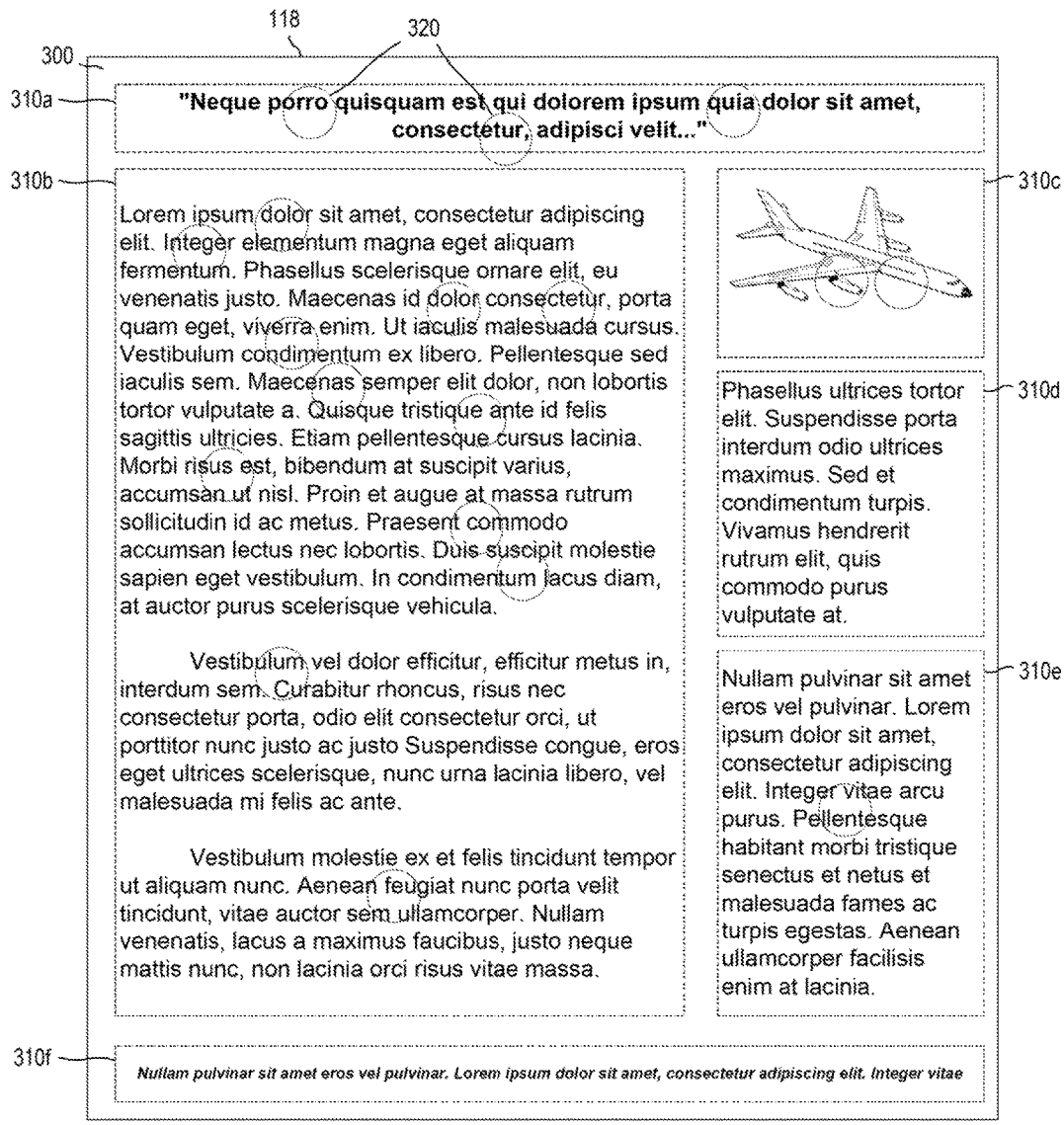
FIG. 3 illustrates example content displayed on an example display.

Layout engine 114 may generally represent any combination of hardware and programming. In some examples, layout engine 114 may be configured to process content. As discussed above, the content may include content of a particular document, file, application, window of an application. In some examples, the content may correspond to all the information being displayed on display 118. In the example of FIG. 3, content 300 corresponds to all or substantially all information being displayed on display 118. In some examples, some of the displayed information may not be included in the content, and in some examples, the content may include information that is not being displayed on display 118 (e.g., information that can be scrolled to).

In some examples, layout engine 114 may determine a set of one or more regions within the content or "divide" the content into a set of one or more regions. Layout engine 114 may determine the regions arbitrarily and/or based on existing structures or boundaries within the content. For example, the content may have existing, visually distinguishable, structures such as frames, chapters, pages, paragraphs, sentences, images, rows, columns, tables, etc., which may sometimes be delimited by lines, white spaces, or other delimiters or visual boundaries. The content may also include underlying structures that may or may not be visually distinguishable. For example, the content may include an HTML webpage having underlying HTML elements such as frames, i-frames, <div> elements, and the like. The arbitrary regions and regions corresponding to existing structures may be rectangular, circular, or have any other common or arbitrary shape.

In some examples, the determined set of regions may cover the entire or substantially the entire content, meaning that any portion of the content is included in at least one region. In other examples, some portions of the content may not be included in any region. In some examples, all regions may be non-overlapping, while in other examples, some regions may overlap. In some examples, the content may include an article (e.g., the main article on a webpage), in which case layout engine 114 may not split the article into multiple regions, and instead may include the article in a single region. As discussed above, a particular region may extend beyond the boundaries of display 118, such that at a given point in time some, but not all, portions of the region may be displayed on display 118. In the example of FIG. 3, layout engine 114 processes content 300 and determines, based on content 300, regions 310a, 310b, 310c, 310d, 310e, and 310f, schematically represented by dashed rectangles.

As discussed above, layout engine 114 may obtain from detection engine 112 a set of gaze locations that may correspond to locations (e.g., X-Y coordinates) on display 118. In some examples, layout engine 114 may determine which region within the determined set of regions corresponds to or encapsulates each gaze location. For example, layout engine 114 may determine which portion of the content is displayed at the gaze location and then determine the region to which that portion belongs.

In some examples, computing device 110 may be configured to automatically trigger an interrupt (e.g., an event) at fixed time intervals (e.g., every $\frac{1}{30}$ (sec)) and calculate the gaze location periodically at those intervals. In other examples, computing device 110 may be configured to trigger an interrupt every time detection engine 112 determines a new gaze location. An interrupt handler (e.g., an event listener) may be set up to receive information identifying the particular region corresponding to the gaze location, i.e., the region within which the gaze location was detected. For example, layout engine 114 may add or register an event listener (e.g., a mouse event listener) associated with each region (e.g., associated, with the underlying HTML element, if any), and detecting engine 112 may be configured to automatically move a cursor (e.g., a mouse cursor) on display 118 to the newly detected gaze location, thereby tying the mouse movements to gaze locations. Thus, every time a new gaze location is detected, a cursor may be moved to the gaze location and the corresponding event listener identifying the corresponding region may be automatically triggered. In some examples, the event listener may be configured to be triggered when the user's gaze enters the region and/or when the users gaze leaves the region (e.g., when the cursor first enters the region and/or when it leaves the region and enters another region).

Based on the determined gaze locations and the corresponding regions, layout engine 114 may determine gaze statistics associated with each region. For example, layout engine 114 may determine for each region its total gaze count—the total number of times the user has looked at the region. Additionally or alternatively, in some examples, layout engine 114 may determine for each region the total gaze duration associated with that region—the total time the user has spent looking at the region. In some examples, layout engine 114 may collect additional gaze statistics for each region, such as the average, median, maximum, or minimal gaze duration associated with the region.

In some examples, layout engine 114 may also determine the size of each region (e.g., in, pixels, square inches, or using other measures). Based on the region size, layout engine 114 may determine the "gaze density" of each region. Gaze density may be calculated, for example, as the total number of gazes divided by the region size, or as the total gaze duration divided by the region size, or using any other formula based on the size of the region, the total number of gazes, the total gaze duration, and/or any other factors.

In some examples, layout engine 114 may determine, based on the gaze locations and the determined set of regions (e.g., based on gaze statistics), a set of one or more regions of interest. For example, layout engine 114 may designate one or more regions as regions of interest. Layout engine 114 may designate as regions of interest any regions whose total gaze count exceeds a predefined gaze-count threshold, and/or whose total gaze duration exceeds a predefined gaze-duration threshold, and/or whose gaze density exceeds a predefined gaze-density thresholds. The predefined gaze-count threshold may be zero, meaning that even one gaze at a region may qualify the region as a region of interest, or it may be a positive number such as 5, 20, 100, etc. The predefined gaze-duration threshold may be 0 (sec), meaning that even the shortest gaze within the region may qualify it as a region of interest, or it may be a positive duration such as 1 (sec), 5 (sec), 20 (sec), etc. The predefined gaze-density threshold may be 0 (gazes/pixel), meaning that even a single gaze at the largest possible region may qualify the region as a region of interest, or it may be a positive density such as 1/100 (gazes/pixel), 1/10000 (gazes/pixel), etc.

In some examples, layout engine 114 may have a predefined minimum number of regions of interest and/or a predefined maximum number of regions of interest. Thus, layout engine 114 may determine the regions of interest such that their number is not lower than the predefined minimum and/or not higher than the predefined maximum. For example, layout engine 114 may assign a score, or a level of interest, for each region based on the statistical gaze information. Layout engine 14 may then designate a number of top-scored regions as regions of interest, where the number is not lower than the predefined minimum and/or not higher than the predefined maximum. It is appreciated that the above examples are not limiting, and that layout engine 114 may determine the regions of interest based on any other formula using these and/or other types of statistical or non-statistical data associated with each region.

In the example illustrated in FIG. 3, display 300 displays content 300, and detection engine 112 determines a number of gaze locations 320. In this example, two gaze locations fall within region 310a, twelve gaze locations fall within region 310b, two gaze locations fall within region 310c, one gaze locations falls within region 310e, and no gaze locations fall within regions 310d and 310f. It will be assumed, for the purposes of the example illustrated in FIG. 3, that layout engine 114 designates any regions having a total gaze count higher than one as regions of interest, irrespective of their total gaze duration, gaze density, or other factors. Therefore, in this example, regions 310a, 310b, and 310c are designated by layout engine 114 as regions of interest, and regions 310d, 310e, and 310f are not.

After determining the set of one or more regions of interest, layout engine 114 may generate modified content. The modified content may include any content included in regions designated as regions of interest, and may not include any content included in regions not designated as regions of interest. Thus, in the example of FIG. 3, modified content may include regions 310a, 310b, and 310c, but not regions 310d, 310e, and 310f. In some examples, layout engine 114 may generate the modified content by removing or hiding from the original content any regions not designated as regions of interest. For example, if the content includes an HTML webpage, and a particular region corresponds to an HTML element (e.g., a DOM object), layout engine 114 may hide that region by modifying the "display" attribute of that HTML element. Alternatively, layout engine 114 may delete the HTML element from the HTML webpage. In some examples, layout engine 114 may also rearrange the regions included in the modified content in a different way, optimizing their layout. FIG. 4 illustrates example modified content 400 corresponding to the original content 300 of the example of FIG. 3.

In some examples, layout engine 114 may send the modified content to a display (e.g., display 118), to a printing device (e.g., printing device 150), to a remote computer (e.g., via one or more networks such as the Internet) or to any other device or module communicatively coupled to computing device 110 or printing device 150. Additionally or alternatively, layout engine 114 may store the modified content, for example, in a memory of computing device 110.

In some examples, layout engine 114 may receive a rendering command (e.g., a "Print" command issued by the user) and in response to the rendering command provide the modified content for rendering. Providing the modified content for rendering may include providing the modified content for display on display 118 (e.g., for a print-preview purposes) and/or for printing by printing device 150. Printing device 150 may be configured to print the modified content after receiving the modified content from computing device 110.

In the foregoing discussion, engines 112 and 114 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like. In another example, the engines 112 and 114 may be implemented by hardware logic in the form of electronic circuitry, such as application specific integrated circuits.

Figure 5:
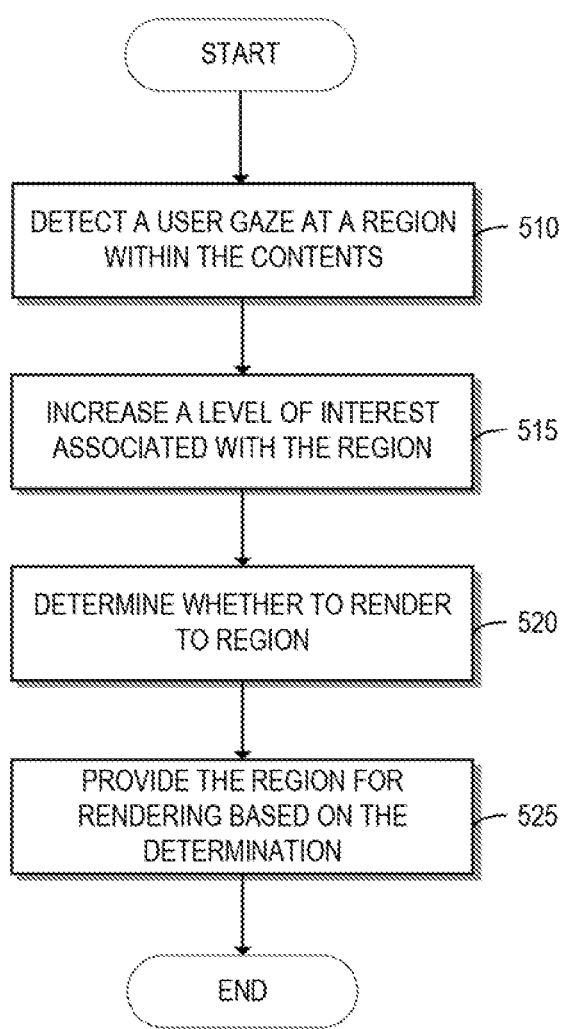
FIG. 5 shows a flowchart of an example method for determining whether to render a region based on a level of interest associated with the region.

FIG. 5 is a flowchart of an example method 500 for determining whether to render a region based on the level of interest associated with the region. Method 500 may be described below as being executed or performed by a system or by a computing device such as computing system 110 of FIG. 1. Other suitable systems and/or computing devices may be used as well. Method 500 may be implemented in the form of executable instructions stored on at least one non-transitory machine-readable storage medium of the system and executed by at least one processor of the system. Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or less blocks than are shown in FIG. 5. In some examples, one or more of the blocks of method 500 may, at certain times, be ongoing and/or may repeat.

At block 510, the method may detect a user gaze directed at a region within a content displayed on a display. As discussed above, detecting the user gaze may include, for example, capturing an image by a camera (e.g., camera 116) facing a user who faces the display, determining a display location (also referred to as a "gaze location") based at least on the image, and determining the region based at least on the display location. Detecting the user gaze may also include tying a mouse cursor location to the determined display location, and listening to a mouse event listener associated with the region, as discussed above.

At block 515, the method may increase a level of interest associated with the region. As discussed above, the level of interest may include or be associated with at least one of a total gaze count and a total gaze duration. Increasing the level of interest may include, for example, increasing the total gaze count by one, increasing the total gaze duration based on a duration of the user gaze, or both.

At block 520, the method may determine, based at least on the level of interest, whether to render the region. At block 525, the method may, responsive to a rendering command, provide the region for rendering based on a determination to render the region, and not providing the region for rendering based on a determination not to render the region. As discussed above, providing the region for rendering may include, among other things, providing the region for display by the display, providing the region for printing by a printing device, or both.

Figure 6:
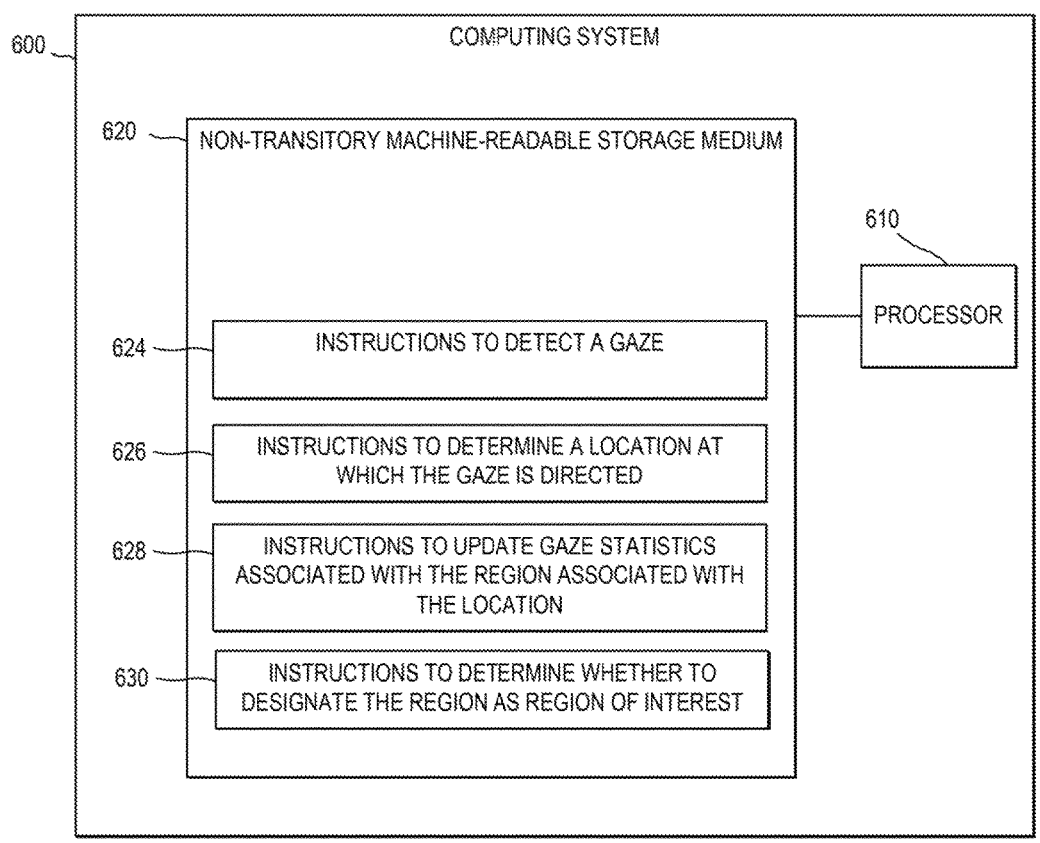
FIG. 6 is a block diagram of another example computing device.

FIG. 6 is a block diagram of an example computing device 600. Computing device 600 may be similar to computing device 110 of FIG. 1. In the example of FIG. 6, computing device 600 includes a processor 610 and a non-transitory machine-readable storage medium 620. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in non-transitory machine-readable storage medium 620. In the particular example shown in FIG. 6, processor 610 may fetch, decode, and execute instructions 624, 626, 628, 630, or any other instructions not shown for brevity. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 620 may be any electronic, magnetic, optical, or other physical storage device that stores executable instructions. Thus, medium 620 may be, for example, Random Access Memory (RAM), an Electrically-Erasable Programmable Read-Only Memory (EEPROM), a storage drive, an optical disc, and the like. Medium 620 may be disposed within computing device 600, as shown in FIG. 6. In this situation, the executable instructions may be "installed" on computing device 600. Alternatively, medium 620 may be a portable, external or remote storage medium, for example, that allows computing device 600 to download the instructions from the portable/external/remote storage medium. In this situation, the executable instructions may be part of an "installation package". As described herein, medium 620 may be encoded with executable instructions for finding a network device on a network.

Referring to FIG. 6, instructions 624, when executed by a processor, may cause a computing device to detect a gaze by a user at a display displaying content, wherein the content may include a set of regions (e.g., frames, sections, pages, paragraphs, sentences, columns, rows, etc.) Instructions 626, when executed by a processor, may cause a computing device to determine a location, within the display, at which the gaze is directed. Instructions 628, when executed by a processor, may cause a computing device to update gaze statistics associated with the region (from the set of regions) that is associated with the determined location. As discussed above, the gaze statistics may include, for example, any combination of a total number of gazes associated with the region, a total duration of the total number of gazes, and any other relevant statistics. Instructions 630, when executed by a processor, may cause a computing device to determine, based at least on the gaze statistics, whether or not to designate the region as a region of interest. As discussed above, this may include calculating a gaze density associated with the region and comparing the calculated gaze density to a predefined density threshold, where the gaze density may be calculated based at least on a size of the region and at least one of the total number of gazes and the total duration.

Other instructions, not shown in FIG. 6 for brevity, may include instructions that, when executed by a processor, may cause a computing device to receive a user command and responsive to the user command generate modified content. As discussed above, the modified content may include any regions within the set of regions that were designated as regions of interest, but no regions within the set of regions that were not designated as regions of interest. As was also discussed above, the user command may include a print command, and the instructions may also to cause the computing device to provide the modified content for printing.

The invention claimed is:

1. A computing device comprising:
   a processor; and
   a non-transitory computer-readable storage medium storing instructions that when executed by the processor realize:
   a detection engine to obtain a set of images captured by a camera facing a user, and to detect, based on the set of images, a set of gaze locations on a display displaying content; and
   a layout engine to:
      determine a set of regions within the content, according to a structure of the content,
      determine, for each region, a size of the region;
      determine, for each region, a gaze density of the region as a number of gaze locations within the region divided by the size of the region, the gaze locations for the region defined as a total number of user gazes directed at the region or a total duration of user gazes directed at the region,
      determine, based on the set of gaze locations, a set of regions of interest within the set of regions that the gaze densities of which are each greater than a threshold, and
      generate modified content comprising the set of regions of interest and not comprising any regions within the set of regions that are not within the set of regions of interest.

2. The computing device of claim 1, wherein the layout engine is further to send the modified content to at least one of the display and a printing device.

3. The computing device of claim 1, wherein determining the set of regions of interest comprises determining, for at least one region within the set of regions, at least one of i) a total number of user gazes directed at the region and ii) a total duration of user gazes directed at the region.

4. The computing device of claim 1, wherein the content comprises an HTML page, and the set of regions corresponds to a set of HTML elements.

5. The computing device of claim 1, wherein the gaze locations for the region are defined as the total duration of user gazes directed at the region.

6. A method comprising:
   determining a region within a content displayed on a display, according to a structure of the content;
   detecting a gaze count as a number of times a user gaze is directed at the region;
   determining a size of the region;
   determining a gaze density of the region as the number of times the user gaze has been directed at the region divided by the size of the region, the gaze count for the region defined as a total number of user gazes directed at the region or a total duration of user gazes directed at the region, the gaze density corresponding to a level of interest associated with the region;
   based at least on the level of interest, determining whether to render the region, by comparing the gaze density to a threshold; and
   responsive to a rendering command, providing the region for rendering based on a determination to render the region, and not providing the region for rendering based on a determination not to render the region.

7. The method of claim 6, wherein the detection of the user gaze directed at the region comprises:
   capturing an image by a camera facing a user facing the display;
   determining a display location based at least on the image; and
   determining the region based at least on the display location.

8. The method of claim 7, wherein detecting the user gaze comprises:
   tying a mouse cursor location to the determined display location; and
   listening to a mouse event listener associated with the region.

9. The method of claim 6, wherein providing the region for rendering comprises at least one of providing the region for display by the display and providing the region for printing by a printing device.

10. A non-transitory machine-readable storage medium encoded with instructions executable by at least one processor of at least one computing device to cause the computing device to:
    detect a gaze by a user at a display displaying content, wherein the content comprises a set of regions that are determined according to a structure of the content;
    determine a location within the display at which the gaze is directed;
    update gaze statistics associated with a region, from the set of regions, that is associated with the determined location, including increasing a gaze count for the region;
    determine a size of the region;
    determine a gaze density of the region as the gaze count divided by the size of the region, the gaze count for the region defined as a total number of user gazes directed at the region or a total duration of user gazes directed at the region; and
    based on the gaze statistics, including based on a comparison of the gaze density to a threshold, determine whether to designate the region as a region of interest.

11. The non-transitory machine-readable storage medium of claim 10, wherein the gaze statistics associated with the region further include at least one of i) a total number of gazes associated with the region and ii) a total duration of the total number of gazes.

12. The non-transitory machine-readable storage medium of claim 10, wherein the instructions are further to cause the computing device to:
    receive a user command;
    responsive to the user command, generate modified content such that the modified content comprises:
       any regions within the set of regions that are designated as regions of interest, and
       no regions within the set of regions that are not designated as regions of interest.

13. The non-transitory machine-readable storage medium of claim 12, wherein the user command comprises a print command, and wherein the instructions are further to cause the computing device to provide the modified content for printing.

* * * * *